June 24, 1952

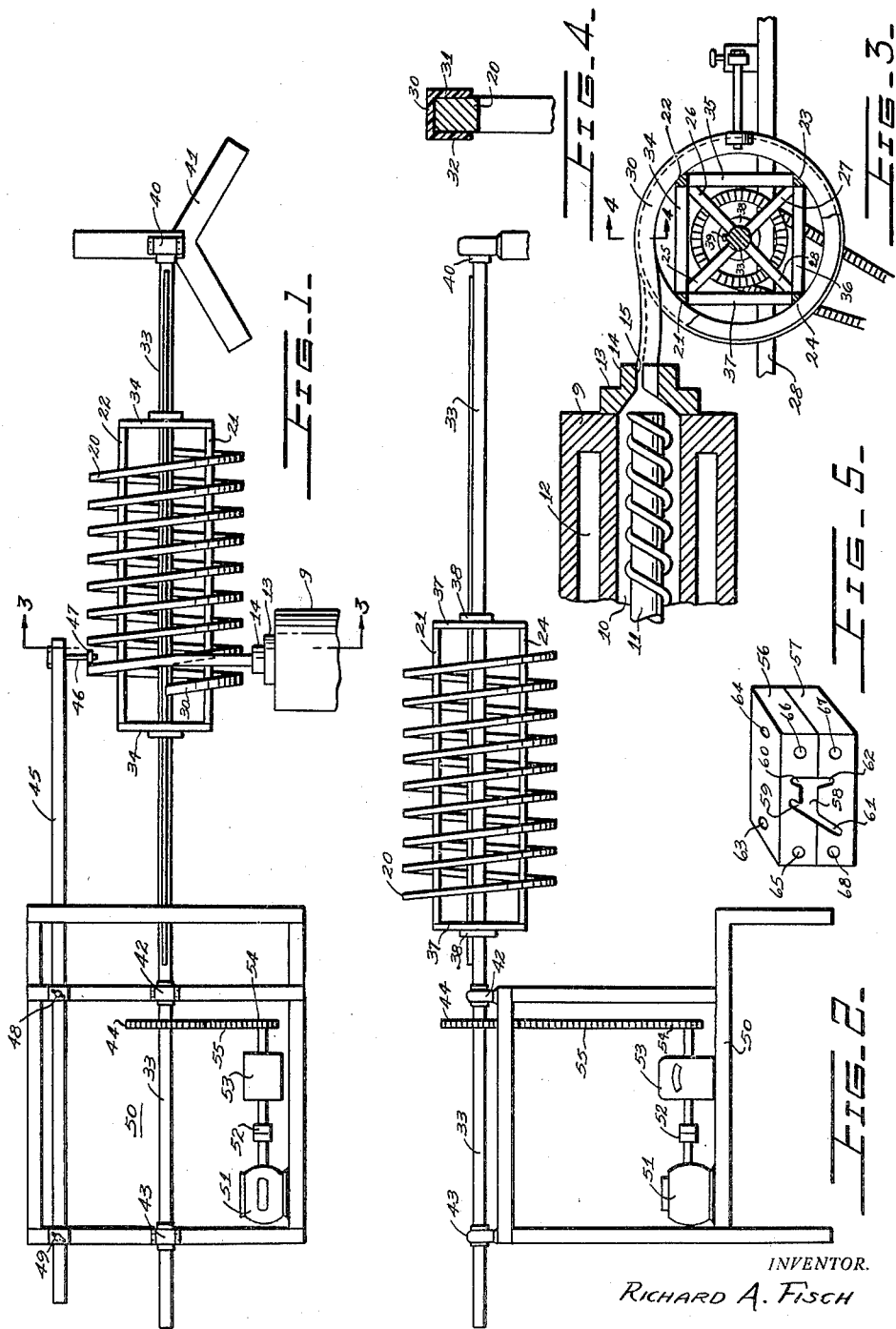

R. A. FISCH 2,601,269

CURVED LENGTHS OF PLASTIC MATERIAL
AND APPARATUS FOR MAKING THE SAME

Filed March 18, 1949

INVENTOR.
RICHARD A. FISCH

BY Grune & Durr
ATTORNEY

INVENTOR.
RICHARD A. FISCH
BY Greene & Durr
ATTORNEY

Patented June 24, 1952

2,601,269

UNITED STATES PATENT OFFICE 2,601,269

CURVED LENGTHS OF PLASTIC MATERIAL AND APPARATUS FOR MAKING THE SAME

Richard A. Fisch, Kew Gardens, N. Y.

Application March 18, 1949, Serial No. 82,052

5 Claims. (Cl. 18—12)

This invention relates to an apparatus for producing a curved linear member with an irregular or unsymmetrical cross sectional shape by extrusion.

Heretofore it has been attempted to produce curved linear products by extruding a straight linear product of the desired cross sectional shape and thereafter softening and bending or curving a length of the product. This process has met with a fair amount of success with flat, rod or tubular stock, etc. but has proved to be entirely unsuccessful with flanged or channel members or other linear products having an irregular cross sectional shape. When it is attempted to bend such straight member having an irregular non-symmetrical cross sectional shape, by softening and then bending, distortion and buckling results. For example, in bending a channel member, there is nothing in the channel part to tend to balance the unequal tension or compression to which the edges of the channels are subjected and the sides of the channels are therefore split, buckled, flared inwardly or outwardly, or otherwise deformed. If such straight channel members are plasticized sufficiently to remove all the tension which would occur in bending, the channel members lose their shape entirely.

An object of this invention, therefore is to provide an apparatus for producing curved linear products having irregular cross sectional shape.

Another object of the invention is to provide an apparatus for simultaneously extruding and curving a strip of plastic material with an irregular cross sectional shape such as a channel member.

Another object of the invention is to provide an apparatus adapted to produce a circularly curved strip of plastic material with an irregular cross sectional shape.

Another object of the invention is to provide an apparatus for producing a non-circularly curved strip of extruded plastic material.

Another object of the invention is to provide a curved strip of plastic material which has continuous, uniform and regularly formed circular flanges projecting from the main body of the strip.

These objects and others ancillary thereto are obtained by providing an extruding machine having a die adapted to give the desired irregular cross sectional shape to an extruded strip with a strip curving, a cooling member which is located adjacent the mouth of the extrusion die. The strip is kept on the curving and cooling member until the plastic sets.

The strip curving and cooling member in its simplest form extends spirally with the axis thereof at substantially right angles to the direction of extrusion and the spiral moves across the space in front of the die of the extruder to lead the extruded strip away from the extrusion machine. The strip curving member can also be of the continuous type with a plurality of supporting members arranged in the form of a cylinder. The curving and cooling member may be heated or cooled or heated at one end and cooled at the other end depending on the nature of the material being shaped, preferably, however, the plastic material is permitted to set at room temperature.

It is also possible to make elliptically curved or other irregularly curved strips by the present invention. However, for this type of material a new type of extrusion means is provided in which the extrusion nozzle is located at the end of a flexible tube and is adapted to move up, down, forward and backward to always be the proper distance from the spiral supporting means with the elliptical or otherwise irregular helices. The apparatus and method of this invention should be distinguished from the ordinary filament forming or spinning apparatus where filaments having cross sectional dimensions of 1 or 2 millimeters or less may be extruded from a completely liquified solution or melt. According to the present invention the extruded products have at least one cross sectional dimension of which is at least of the order of ½ centimeter and the other dimensions of which are sufficiently large to make a self-supporting product. The thermoplastic which is extruded is extruded under relatively high pressure but at a temperature insufficient to produce a non-plastic liquid melt. In other words when the extruded strip leaves from the nozzle it is practically self-supporting and is stiff enough to retain the cross sectional shape given it by the nozzle. It might be said that the plastic is plasticized in the extruding chamber to a degree which is slightly beyond the "rubber elastic state" of the thermoplastic material.

Any plastic material which is ordinarily formed by extrusion may be formed into a curved channel member according to the present invention. The essential feature is that the plastic strip member be stiff enough when extruded to retain substantially the cross sectional shape given it by the nozzle and then be supported and shaped on the curved supporting member before it is first hardened to an unworkable state after coming from the extrusion machine. Very flexible plastic materials such as the natural and synthetic rubbers can be bent to circular shape at any time after extrusion but this invention is especially suitable for the stiffer plastic materials which are pliable only at the time of extrusion.

Such curved channel members are extremely desirable and useful for mounting curved plates, for example, curved glass plates in picture frames and lenses, for curved insulating gaskets, for mounting the edges of curved cylindrical or conical tubes such as the outer edge of a cathode ray tube, etc. After the spiral strip has been removed from the cooling device it can be cut to form the circular or arcuate member.

It has been proposed to form circular and non-circular gaskets by extruding cylindrical tubes or elliptical tubes and then slicing such tubes to form the gaskets. The products formed by the present invention are different from such products in form and structure. The products of the present invention can be given any desired cross sectional shape and do not have any cut sides. More important, perhaps, is the fact that the preferred alignment of micellar particles, which results due to the fact that the strip is extruded longitudinally, is parallel to the length of the strip or circumferentially with respect to the curves of the helix whereas when a tube is extruded the preferred alignment of micellar particles is parallel to the axis of the cylinder and perpendicular to the circumference of the sliced gaskets.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1 is a top plan view showing one form of the apparatus of the present invention.

Figure 2 is a front view of the cooling and supporting device of Figure 1.

Figure 3 is a side view taken on line 3—3 of Figure 1.

Figure 4 is a detail cross sectional view of the supporting spiral means with a channel member supported thereon.

Figure 5 is a front view of a modified form of die from which a curved strip is to be formed.

Figure 6:
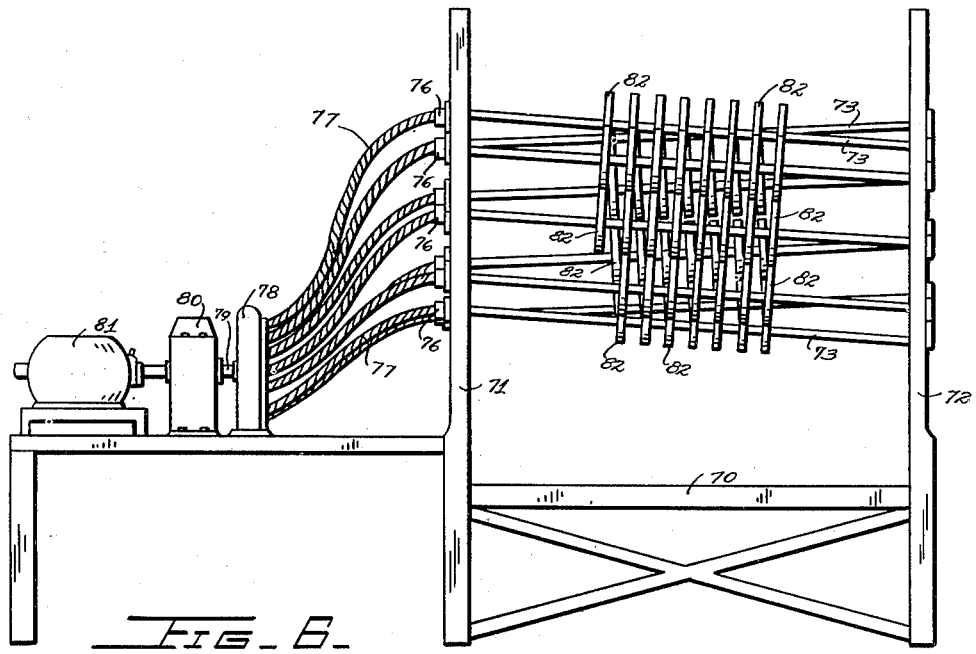
Figure 6 is a front view of one type of continuous cooling device.

In Figures 1 and 3 of the drawings, a conventional type of extrusion device 9 is shown. This extrusion device has a heating and extrusion chamber 10 containing a feeding screw 11 and heating chambers 12. A die 13 is fastened at the end of the chamber 10. The die 13 is of considerable length, the central portion 14 having a somewhat reduced external diameter. Substantially centrally located in the center of section 14 is the extrusion orifice 15 which is adapted to produce an extruded strip 30 having the cross sectional shape of a channel.

Located with an upper portion of its perimeter adjacent to the mouth or orifice 15 of the extrusion device 9 is the curving and cooling spiral 20. The spiral supporting member 20 has a cross sectional shape which is adapted to extend at least part of the way into the space between the flanges 31, 32 of the channel member 30. The supporting spiral member 20 is mounted on the internal longitudinal frame strips 21, 22, 23, 24 which are held in position on the rotating shaft 33 by radial members 25, 26, 27, 28 and cross bars, 34, 35, 36 and 37 at each end thereof. The radial members 25, 26, 27 and 28 are secured to a hub 38 having a key shaped opening therein into which the key shaped shaft 39 is adapted to fit. Thus the shaft 33 will rotate the cage made up of the members 21—28 and the spiral supporting member 20 but will permit the cage to move axially along the shaft 33. The shaft 33 is supported at one end in a bearing 40 which in turn is held in position by a tripod 41. At the opposite end the shaft 33 is held by two bearings 42 and 43 between which a driving gear 44 is attached to the said shaft 44. The bearings 42, 43 as well as suitable driving means are supported in a frame structure 50. The driving means shown comprises a motor 51, a universal joint 52, a variable speed-reducing device 53, and a gear 54 which is connected to the gear wheel 44 by endless chain 55.

Also fixed to the frame 50 by suitable clamps 48, 49 is the extending arm 45. The end of the arm 45 contains the shaft 46 on the end of which is the roller 47. The roller 47 bears against the inside surface of the spiral causing the spiral to move in front of the nozzle 14 as it rotates.

As stated above various cross sectional shapes of strips may be extruded and curved by this process and apparatus. Figure 5 shows a die for forming a curved strip with two internal and two external flanges. The die is made up of two plates 56 and 57. The upper plate 56 contains the indentations to form the body 58 and two of the flanged portions 59 and 60, and the lower plate has openings adapted to form the other two flanged portions 61 and 62. Orifices 63 and 64 may be provided for holding the plates 56 and 57 together and orifices 65, 66, 67 and 68 may be provided for attaching the nozzle to the extrusion machine.

Figure 7:
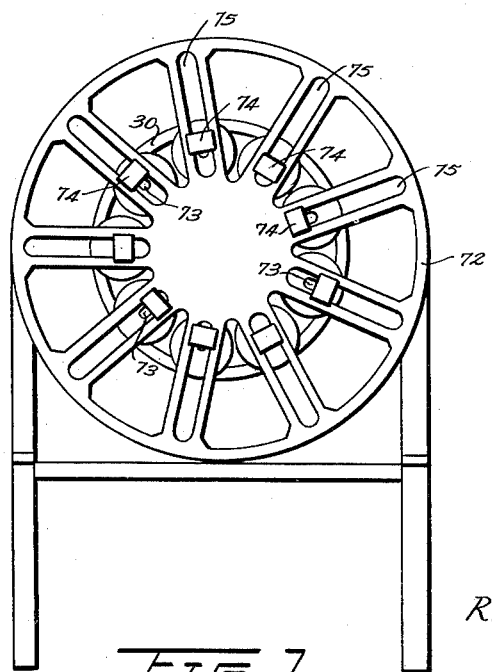
Figure 7 is a side view of the device of Figure 6.

One continuous type of cooling, curving and supporting device for the freshly extruded strip material is shown in Figures 6 and 7. This device comprises a supporting structure 70 having two end panels 71, 72 adapted to adjustably support bearings for a plurality of shafts 73. The panel end 72 contains a plurality of radial slots 75 along which slots the bearings 74 can be secured. The panel 71 is similarly constructed except that the shaft 73 extends through the bearings and is attached at 76, 76 to one of the flexible shafts 77, 77 which in turn is attached and rotated by one of the planetary gears (not shown) on a conventional planetary gear mechanism 78. The sun gear (not shown) of the planetary gear mechanism 78 is driven by shaft 79 from the speed reducing gear 80 which in turn may be driven by the electric motor 81.

The shafts 73 contain a plurality of fixed rollers or pulleys 82, 82 which together form a cage along which the extruded strip is moved in the form of a helix. All the shafts 73 and pulleys 82 are rotated in the same general direction but each shaft 73 is askew with respect to the general axis of the cage so that the outer part of each pulley 82 tends to carry a strip placed thereon forwardly and towards one side. The combined effect of all the pulleys 28 is to move the extruded strip in the form of a spiral. Preferably the freshly extruded strip will be fed onto the cooling device adjacent the panel 71 and will pass off of the rollers adjacent the panel 72. The extruded strip may be threaded onto the device in the first place by hand or by placing a previously formed strip on the spirally directed pulleys and adhering the freshly extruded strip to the end of the previously formed strip which then guides the newly extruded portion to the proper pulleys. If there is any tendency for the extruded strip to sag between pulleys 82 the pulleys can be made smaller and the number of shafts 73 can be increased, or, small stationary curved members may be fixed between two or more of the pairs of adjacent pulleys 82 onto which the strip is first guided.

Figure 8:
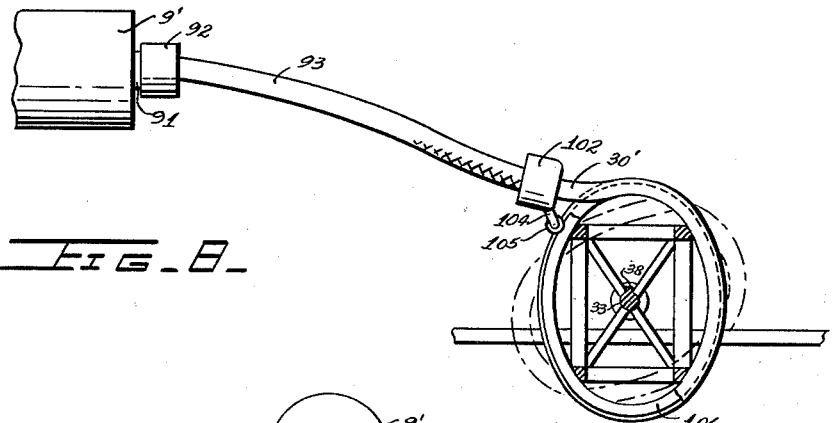
Figure 8 is a side view of the modified form of extrusion device and an elliptical forming and supporting means.
Figure 9:
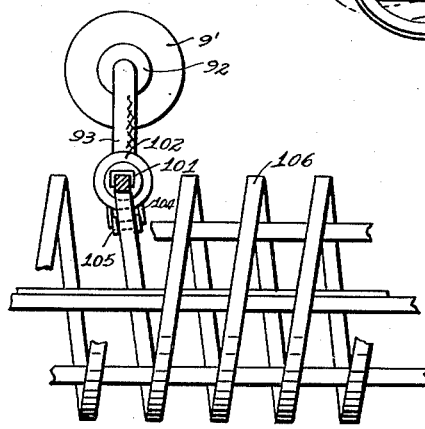
Figure 9 is a front view of the device of Figure 8.
Figure 10:
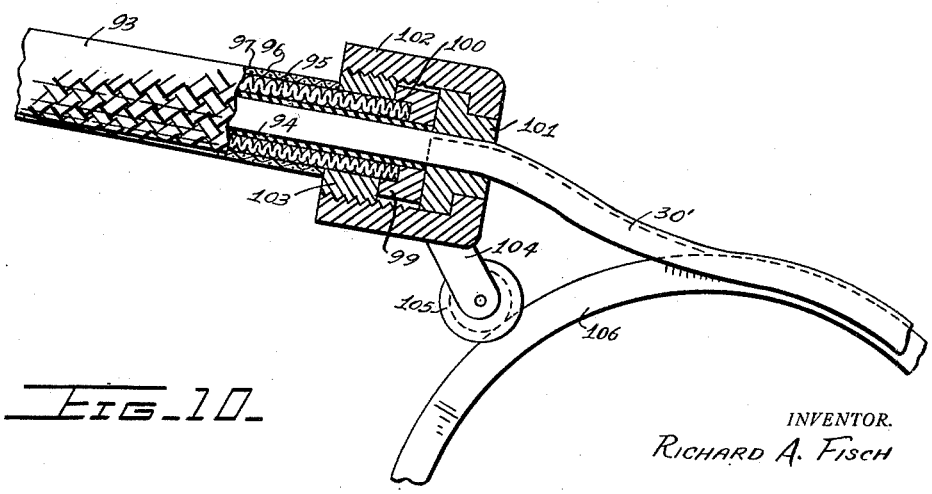
Figure 10 is a detail view partly in cross section showing the construction of the extrusion nozzle of Figure 8.

When it is desired to produce an elliptically curved strip especially when the ellipse is relatively flat the ordinary extrusion device shown in Figure 3 cannot be employed even if the elliptical forming and supporting spiral is driven at a constant surface speed because the distance between the fixed nozzle and the rotating elliptical spiral is constantly varying. In other words, as the flat portion of the ellipse comes up, substantially the whole length of one side of the ellipse must be deposited simultaneously. It has been found, however, that extruded strip can be deposited on such an elliptical spiral supporting device if the outlet of the nozzle is allowed to move up and down so as to be substantially evenly spaced from the spiral on which it is to be deposited. Figures 8-10 show the modified apparatus for permitting the nozzle to move with respect to the forming and supporting spiral. The regular extrusion chamber 9' has an integral collar 91 attached at the opening thereof to which the coupling ring 92 carrying the flexible tube 93 is secured. The flexible tube 93, comprises an inner sleeve 94, a flexible metal tube 95, an outer jacket 96 which may contain a heating element 97. The end of the flexible metal tube element is compressed and welded to the shoulder portion 100 of the collar 99. The nozzle 101 is attached by means of the internally threaded sleeve 102 to the externally threaded ring 103. Attached to the underside of the sleeve 102 is a U-shaped bracket 104, carrying a rotatable grooved pulley 105, adapted to ride on the spiral forming member 106.

The elliptical spiral 106 can be mounted on the shaft 33 just as the spiral 30 is mounted in Figures 1-3. The collar or sleeve 102 is fairly heavy so as to cause the roller 105 to ride on the spiral 106 but if desired additional weight or spring means may be added to assure that the nozzle 101 is properly spaced from the spiral support 106. The elliptical spiral supporting cage may be driven at a substantially constant surface speed by a belt driven elliptical drive pulley (not shown). The supporting cage may also be constructed to move easily so that it can be driven by the energy or forward motion of the extruded strip. As the channel member 30' is extruded it passes on to the spiral forming and supporting means 106 and although the length of the unsupported channel member 30' between the nozzle 101 and the supporting means 106 may vary slightly, the variance is not enough to cause any distortion of the extruded strip.

The apparatus of this invention is especially useful for the production of curved, non-circular lengths of strip materials which have an irregular cross sectional shape since such products cannot be curved after hardening but the apparatus is also advantageous for the production of helices of linear extrusion product of regular cross sectional shapes. The elliptical or irregular helices as made by Figures 8-10 are especially difficult to form after extrusion whereas Figures 8-10 provide a method of making such products without the additional softening and bending step.

I claim:

1. An apparatus for producing curved strips of stiff thermoplastic material having at least one channel therein comprising a strip extrusion device for thermoplastic material having an extrusion orifice and means for heating and forcing thermoplastic material through said orifice in combination with a strip curving and supporting means comprising a helix shaped means having the curvature desired in the extruded strip and having a continuous outside portion adapted to interfit with a channel in said curved strips and adapted to curve and support the extruded strip in curved position and to move the curved strip laterally away from the nozzle in the form of a helix until the curved strip sets by cooling and means for moving the successive portions of said helix curving and supporting means across the area in front of said nozzle.

2. An apparatus for producing strips of stiff thermoplastic material with a predetermined uniform cross sectional area and a predetermined, non-uniform, curvature comprising a heating and pressure chamber for plasticizing a thermoplastic material to a plastic but non-liquid condition and for pressing the plastic material towards an outlet orifice of the chamber, an extrusion nozzle having an orifice of such dimensions as to form a self-supporting article from the plastic material when the plastic material is cooled, a flexible tube connecting the nozzle to the outlet orifice of the heating and pressure chamber, in combination with a strip curving and supporting means positioned adjacent the said orifice and adapted to curve and support the extruded strip in curved position and to move the curved strip laterally away from the nozzle in the form of a helix until the curved strip sets by cooling.

3. An apparatus for producing strips of stiff thermoplastic material with a predetermined uniform cross sectional area and a predetermined, non-uniform, curvature comprising a heating and pressure chamber for plasticizing a thermoplastic material to a plastic but non-liquid condition and for pressing the plastic material towards an outlet orifice of the chamber, an extrusion nozzle having an orifice of such dimensions as to form a self-supporting article from the plastic material when the plastic material is cooled, a flexible tube connecting the nozzle to the outlet orifice of the heating and pressure chamber, in combination with a strip curving and supporting means, comprising a helix shaped means of the non-uniform, irregular cross sectional shape desired, positioned adjacent the said orifice and adapted to curve and support the extruded strip in curved position and to move the curved strip laterally away from the nozzle in the form of a helix until the curved strip sets by cooling.

4. An apparatus for producing strips of stiff thermoplastic material with a predetermined uniform cross sectional area and a predetermined, non-uniform, curvature comprising a heating and pressure chamber for plasticizing a thermoplastic material to a plastic but non-liquid condition and for pressing the plastic material towards an outlet orifice of the chamber, an extrusion nozzle having an orifice of such dimensions as to form a self-supporting article from the plastic material when the plastic material is cooled, a flexible tube connecting the nozzle to the outlet orifice of the heating and pressure chamber, in combination with a strip curving and supporting means comprising a helix shaped means of the non-uniform, irregular cross sectional shape desired, positioned adjacent the said orifice and adapted to curve and support the extruded strip in curved position and to move the curved strip laterally away from the nozzle in the form of a helix until the curved strip sets by cooling, and means for moving the nozzle in harmony with the irregularity of the helical curving and supporting means so that the extrusion orifice is always approximately the same distance from the point where the extruded strip is being deposited on the curving and supporting means.

5. An extruded curved strip of thermoplastic material for a body position and at least two shield forming flanges extending therefrom and having a uniform cross section in the form of an elliptical helix of regularly repeating turns, the said strip having a preferred micellar alignment which is parallel to the circumference of the helices.

RICHARD A. FISCH.

REFERENCES CITED

The following references are of record in the file of this patent:

UNITED STATES PATENTS

| Number | Name | Date |
| --- | --- | --- |
| 644,421 | Graham | Feb. 27, 1900 |
| 720,902 | Du Brau | Feb. 17, 1903 |
| 1,584,283 | Fraser | May 11, 1926 |
| 2,039,475 | Campbell | May 5, 1936 |
| 2,080,899 | Pirani et al. | May 18, 1937 |
| 2,422,953 | Davies et al. | June 24, 1947 |